United States Patent
Ciobanu et al.

(10) Patent No.: US 10,712,184 B1
(45) Date of Patent: Jul. 14, 2020

(54) MAGNETIC FLOWMETER ASSEMBLY HAVING INDEPENDENT COIL DRIVE AND CONTROL SYSTEM

(71) Applicant: Georg Fischer Signet LLC, El Monte, CA (US)

(72) Inventors: Calin Ciobanu, Brea, CA (US); Jeffrey Lomibao, La Puente, CA (US)

(73) Assignee: Georg Fischer Signet LLC, El Monte, CA (US)

( * ) Notice: Subject to any disclaimer, the term of this patent is extended or adjusted under 35 U.S.C. 154(b) by 1 day.

(21) Appl. No.: 16/243,868

(22) Filed: Jan. 9, 2019

(51) Int. Cl.
*G01F 1/58* (2006.01)
*G01F 25/00* (2006.01)

(52) U.S. Cl.
CPC .......... *G01F 1/586* (2013.01); *G01F 25/0007* (2013.01)

(58) Field of Classification Search
CPC ................................... G01F 1/58; G01F 25/00
See application file for complete search history.

(56) References Cited

U.S. PATENT DOCUMENTS

| | | | |
|---|---|---|---|
| 5,224,394 A | 7/1993 | Kalinoski | |
| 5,402,685 A | 4/1995 | Brobeil | |
| 6,237,424 B1 * | 5/2001 | Salmasi | G01F 1/002 73/861.11 |
| 6,611,775 B1 * | 8/2003 | Coursolle | G01D 3/032 702/65 |
| 6,829,946 B2 | 12/2004 | Yamamoto | |
| 6,920,799 B1 | 7/2005 | Schulz | |
| 7,084,647 B2 | 8/2006 | Rosskopf et al. | |

(Continued)

FOREIGN PATENT DOCUMENTS

| | | |
|---|---|---|
| CN | 1241714 | 1/2000 |
| CN | 102564503 | 7/2012 |

(Continued)

OTHER PUBLICATIONS

Jorg Holtmann, Virtual Reference for Electromagnetic Flowmeters, EngineerIT, Jun. 2013, http://www.ee.co.za/wp-content/uploads/legacy/EngineerIT_2013/EngIT_June%20%202013__MeasT_Krohne.pdf.

(Continued)

*Primary Examiner* — Jewel V Dowtin
(74) *Attorney, Agent, or Firm* — Tsircou Law, P.C.

(57) ABSTRACT

A magnetic flow meter assembly having a tubular body that has two opposing ends that define a fluid flow path therebetween for a conductive fluid. The magnetic flow meter assembly further includes a pair of coil assemblies which are configured to pass current as received from voltage regulators via a first and second coil driver. The coil assemblies can therefore generate a magnetic field wherein a pair of measuring electrodes detect a voltage induced by the conductive fluid passing through said magnetic field. Moreover, the coil assemblies are each electrically coupled with at least one sensor that provides feedback to a respective voltage regulator via a proportional-integral-derivative (PID) controller configured to minimize the error between a respective measured current and a target current. The respective voltage regulators can use the received feedback to manipulate the current passing through the corresponding coil assembly to enabling a prescribed magnetic field to be created within the fluid flow for accurate flow measurement.

20 Claims, 8 Drawing Sheets

(56) References Cited

U.S. PATENT DOCUMENTS

| | | | |
|---|---|---|---|
| 7,310,582 B2 | 12/2007 | Ishikawa | |
| 7,369,949 B2 | 5/2008 | Yamamoto | |
| 7,779,702 B2 * | 8/2010 | Shanahan | G01F 1/60 |
| | | | 73/861.08 |
| 7,921,733 B2 | 4/2011 | Foss et al. | |
| 8,047,080 B2 | 11/2011 | Ishikawa et al. | |
| 8,136,412 B2 | 3/2012 | Yamamoto et al. | |
| 8,159,806 B2 | 4/2012 | Cartier-Millon et al. | |
| 8,499,647 B2 | 8/2013 | Mitsutake | |
| 8,590,361 B1 | 11/2013 | Feller | |
| 9,163,968 B2 * | 10/2015 | Foss | G01F 15/02 |
| 9,389,107 B2 | 7/2016 | Voigt et al. | |
| 9,395,221 B2 * | 7/2016 | Foss | G01F 1/60 |
| 9,488,511 B2 * | 11/2016 | Barto | G01F 1/584 |
| 9,810,559 B2 * | 11/2017 | Tower, III | G01F 1/584 |
| 10,416,011 B2 * | 9/2019 | Huang | G01F 1/588 |
| 2006/0150746 A1 | 7/2006 | Keese et al. | |
| 2007/0163360 A1 | 7/2007 | Baecker et al. | |

FOREIGN PATENT DOCUMENTS

| | | |
|---|---|---|
| CN | 203011446 | 6/2013 |
| CN | 104251929 | 12/2014 |
| CN | 204556037 | 8/2015 |
| CN | 204740058 | 11/2015 |
| CN | 204831409 | 12/2015 |
| CN | 204963919 | 1/2016 |
| CN | 205209562 | 5/2016 |
| CN | 205212813 | 5/2016 |
| CN | 205300667 | 6/2016 |
| CN | 205352482 | 6/2016 |
| CN | 205679302 | 11/2016 |
| CN | 205719128 | 11/2016 |
| CN | 105422960 | 11/2017 |
| CN | 206638287 | 11/2017 |
| CN | 206638288 | 11/2017 |
| CN | 206818260 | 12/2017 |
| EP | 0306895 | 3/1989 |
| GB | 2183943 | 6/1987 |
| JP | 2001235352 | 8/2001 |
| JP | 2001241983 | 9/2001 |
| JP | 2003042821 | 2/2003 |
| JP | 2004069630 | 3/2004 |
| JP | 2004156936 | 6/2004 |
| JP | 2007151311 | 6/2007 |
| JP | 2007315813 | 12/2007 |
| JP | 2010271042 | 12/2010 |
| JP | 2011033491 | 2/2011 |

OTHER PUBLICATIONS

Ralf Haut, Virtual Reference Grounding for Electromagnetic Flowmeters, Manufacturing.net, Jan. 10, 2012, https://www.manufacturing.net/article/2012/01/virtual-reference-grounding-electromagnetic-flowmeters.

Universal Flow Monitors, Magnetic Flowmeter Technology, www.flowmeters.com/magnetic-technology.

Krohne, Optiflux 4300, Electromagnetic flowmeters, https://ci.krohne.com/en/products/flow-measurement/flowmeters/electromagnetic-flowmeters/optiflux-4300/.

* cited by examiner

MAGNETIC FLOWMETER ASSEMBLY HAVING INDEPENDENT COIL DRIVE AND CONTROL SYSTEM

FIELD OF THE INVENTION

The present invention relates generally to the control and operation of sensors for measuring fluids and more particularly to magnetic flowmeters for performing fluid flow measurements.

BACKGROUND OF THE INVENTION

Magnetic flow meters measure the velocity of conductive fluids passing through pipes by generating a magnetic field and measuring the resultant voltage. These flowmeters rely upon Faraday's Law in which the flow of a conductive fluid through a magnetic field causes a voltage signal which is sensed by electrodes and the sensed voltage is proportional to the fluid velocity.

Magnetic flowmeter assemblies are generally either insertion mag-meters or full bore mag-meters. Insertion mag-meters typically include a sensor body which is placed into a fluid flow and electrodes which are disposed at the distal end of the sensor body. The sensor can include conductive coils that generate a magnetic field which, in combination with the fluid flow creates an electromotive force (voltage), which is then sensed by the electrodes. Full bore mag-meters typically include a tubular body disposed inline along a fluid conduit, with conductive coils disposed on the tubular body that generates a magnetic field across the body and electrodes inserted into the walls of the body.

Although these flowmeters are generally effective, shortfalls exist. For example, these devices can suffer from temperature variations which affect the resistance of the conductive coils, thereby affecting the current flowing through the coils and potentially altering the magnetic field within the fluid flow path and the resultant measured voltage, assuming constant flow rate. Moreover, since the conductive coils can be paired, any deviation between the pair of coils potentially changes the symmetry of the magnetic field, also resulting in an altered magnetic field. These changes to the magnetic field can adversely impact the measurement accuracy of the flowmeter.

It should, therefore, be appreciated there remains a need for a magnetic flowmeter assembly that addresses these concerns. The present invention fulfills these needs and others.

SUMMARY OF THE INVENTION

Briefly and in general terms, the present invention provides a system and related method for generating a magnetic field for a magnetic flowmeter. The system comprises a first coil driver for providing a first current through a first coil assembly, a second coil driver for providing a second current through a second coil assembly, and a corresponding sensor for measuring an electrical property associated with the first and the second coil assemblies respectively. The system is further configured to provide feedback to a first and second voltage regulator in response to the corresponding measured electrical property. As such, the first and the second voltage regulators can independently modify the current through the first and the second coil assemblies respectively, in response to the feedback signal, and thereby enable a prescribed magnetic field to be created within the fluid flow path while accounting for any non-symmetrical conditions impacting the coil assemblies.

More specifically, by example and not limitation, the system includes a tubular body with opposing ends configured to enable fluid flow therebetween. A pair of measuring electrodes is attached to the tubular body to measure the voltage induced by a conductive fluid flowing through the magnetic field created by the coil assemblies. By using the measured voltage, the fluid velocity and flow rate can be calculated by using a processor electrically coupled to the measuring electrodes.

In a detailed aspect of an exemplary embodiment, the system comprises a respective instrumentation amplifier for scaling the electrical property measured by the corresponding sensor, an analog-to-digital converter for converting the electrical property, and an error amplifier for detecting a difference between the measured electrical property and a targeted (desired) electrical property for a corresponding coil assembly. Based on the detected error, a proportional-integral-derivative (PID) controller provides a pulse-width-modulator (PWM) with an output for minimizing the error detected by using a system tuning process. The PWM output is filtered, buffered and summed into a control feedback for the voltage regulators, which then controls the voltage output, and thus current, passing through a respective coil driver and the corresponding coil assembly.

In another detailed aspect of an exemplary embodiment, the coil drivers are configured to alternate the direction of the current passing through each coil assembly, wherein one cycle in a given time period represents the current flowing in a first direction through each coil assembly, followed by flowing in a second direction through each coil assembly.

In yet another detailed aspect of an exemplary embodiment, the corresponding sensor is embodied as a shunt resistor.

For purposes of summarizing the invention and the advantages achieved over the prior art, certain advantages of the invention have been described herein. It is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention disclosed herein. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings.

DETAILED DESCRIPTION OF THE PREFERRED EMBODIMENTS

Figure 1:
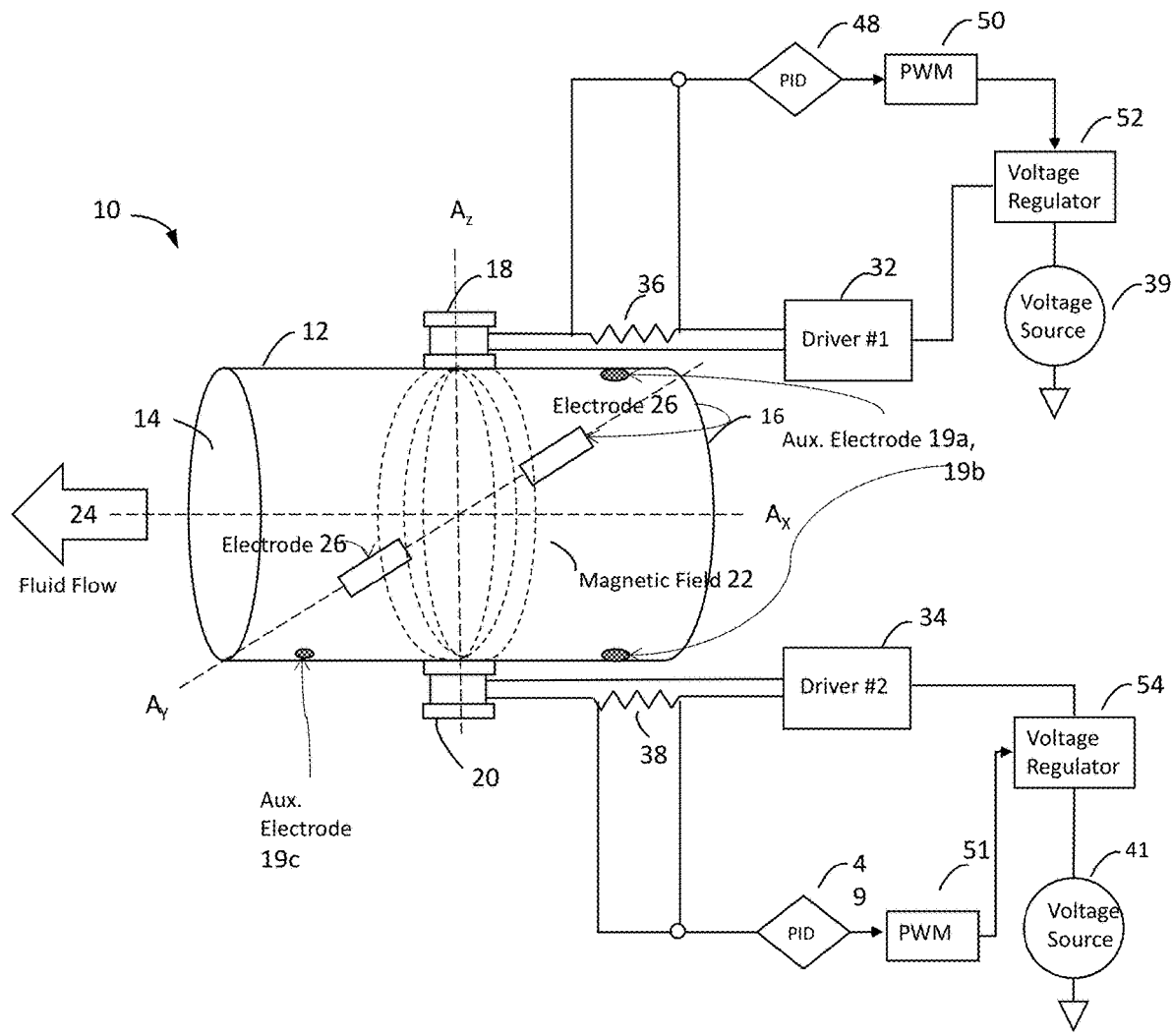
FIG. 1 is a simplified perspective view of a magnetic flowmeter assembly in accordance with the present invention.

Referring now to the drawings, and in particular FIG. 1, there is shown a magnetic flow meter assembly 10 having a novel coil drive and control system. The magnetic flow meter assembly 10 has a tubular body (e.g., pipe) 12 that has two opposing ends 14 and 16 which are aligned along a horizontal axis (Ax) and which define a fluid flow path therebetween. The magnetic flow meter assembly 10 includes a pair of coil assemblies (18, 20) which are coupled to an intermediate region of the flowmeter, and are configured to pass current as received from voltage regulators (52, 54) via a first and second coil driver (32, 34). The coil assemblies (18, 20) can therefore generate a magnetic field 22 within the fluid flow path 24 of the tubular body 12, via the current passing therein. A pair of measuring electrodes 26 attached to the body 12 is configured to detect a voltage induced by the conductive fluid passing through the magnetic field 22. Moreover, the coil assemblies are each electrically coupled with at least one sensor (36, 38) that provides feedback to a respective voltage regulator (52, 54) via a proportional-integral-derivative (PID) controller (48, 49) configured to keep the ERROR between a respective measured current and a target current as zero. As such, based on the corresponding received feedback, each respective voltage regulators (52, 54) can independently manipulate the current passing through the respective coil assembly (18, 20) to overcome factors causing the drive current to deviate from a targeted current, thereby enabling a prescribed magnetic field to be created within the fluid flow for accurate flow measurement.

With continued reference to FIG. 1, the coil assemblies (18,20) can be externally coupled to the tubular body 12, aligned along a vertical axis (Az) which is orthogonal to the longitudinal axis (Ax). The pair of measuring electrodes 26 can be aligned along axis (Ay) which is orthogonal to the longitudinal axis (Ax) and vertical axis (Az), and configured to detect the voltage induced by being in electrical communication with the fluid within the fluid flow path. The magnetic flowmeter assembly 10 further includes a plurality of auxiliary electrodes 19 (a, b, c), including a first auxiliary electrode 19(a) and a second auxiliary electrode 19(b) that are disposed upstream of the pair of measuring electrodes 26. The first and the second auxiliary electrodes are aligned with the axis (Az), on opposing sides of the pipe, such that axis (Ay) and axis (Az) are coplanar. A third auxiliary electrode 19(c) is disposed downstream of the pair of measuring electrodes 26. The measuring electrodes and the auxiliary electrodes are each mounted to a corresponding aperture formed in the wall of the pipe 12.

Figure 11:
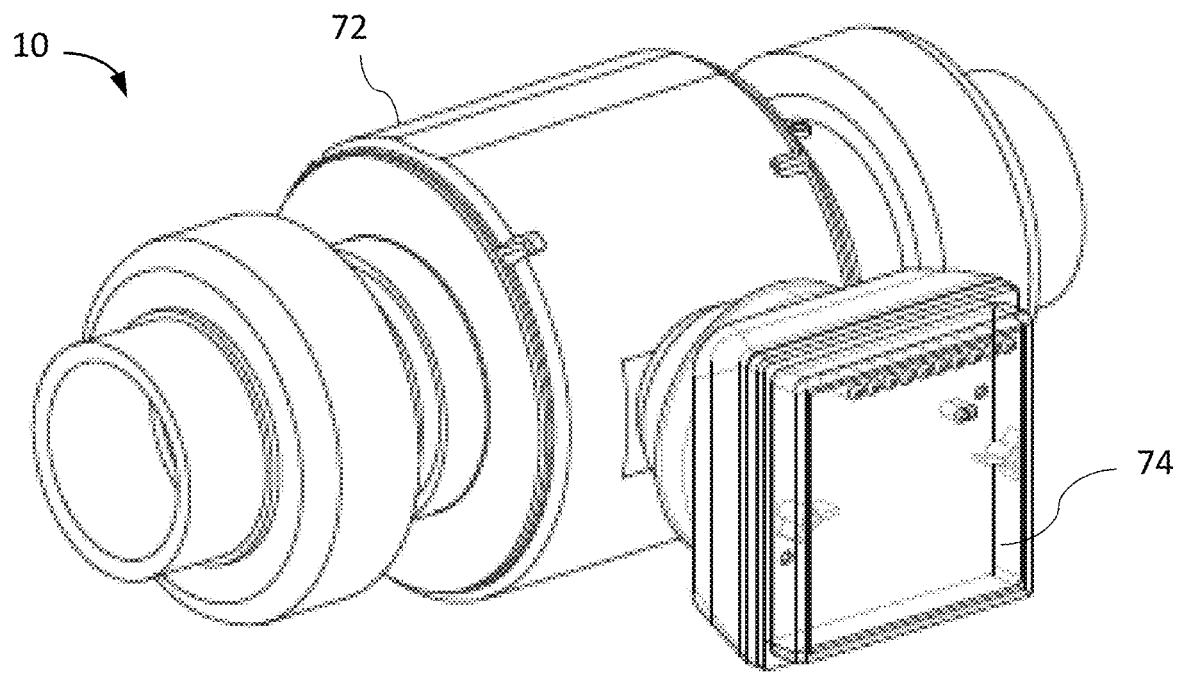
FIG. 11 is a simplified perspective view of a magnetic flowmeter assembly of FIG. 10, further comprising a shield housing and electronic assembly.

A housing is coupled to the external of the body configured to hold at least one processor that is electrically coupled to the electrodes (as seen in FIG. 11). In an exemplary embodiment, each of the two measuring electrodes 26 are followed by a signal conditioning path consisting of high sensitivity Op Amps and an Adjustable Gain Instrumentation Amplifier. The measured voltage potential (difference measured between the two measuring electrodes) is further processed by a high-resolution Analog-to Digital Converter and processor. The digitally converted voltage potential is further scaled and processed by a second processor to accurately display and/or provide a multitude of outputs that are proportional with the flow, i.e. digital outputs, 4-20 mA analog output.

In certain embodiments of the present invention, the magnetic flowmeter assembly can be configured as described and claimed in Applicant's patent application, entitled "FULL BORE MAGNETIC FLOWMETER ASSEMBLY, U.S. application Ser. No. 16/146,090, filed Sep. 28, 2018, which is hereby incorporated by reference for all purposes.

The magnetic flow meter assembly 10 relies upon Faraday's Law of Electromagnetic Induction to measure the velocity of the conductive fluid in the tubular body. Specifically, Faraday's Law states that the voltage induced across any conductor that moves at right angles through a magnetic field is proportional to the velocity of the conductor.

Ue is proportional to v×B×L

Where:
Ue=inducted voltage (i.e., signal voltage)
v=average velocity of conductive fluid
B=magnetic field strength
L=length of the conductor (i.e., distance between electrodes)
Alternatively, the fluid velocity v is proportional to $$\frac{Ue}{B \times L}$$

The flow of the conductive liquid through the magnetic field B creates a voltage signal Ue which can be sensed by the pair of measuring electrodes (26) and which in-turn can be used to calculate the velocity v of the conductive fluid. Magnetic flow meters are generally very accurate (e.g., <1% measurement error). As Faraday's equation illustrates, variations in the magnetic field strength B can cause significant errors in the fluid velocity v measurement.

As aforementioned, the magnetic field can be created by a pair of coil assemblies coupled to a magnetic flow assembly. Moreover, it is known that for a Helmholtz coil pair, the magnetic field B is proportional to the current I and the number of loops (e.g., number of turns), and the direction of the magnetic field is determined by the current polarity based on the right-hand rule. It is also known that the greater the magnetic field, the greater the voltage induced by a current as measured via the electrodes.

Accordingly, variations in the magnetic field B strength can introduce significant errors into the fluid flow measurement. These variations can be caused by a number of factors including temperature changes of the coils, differences in the coil's electrical properties, drift of the drive electronics, and dimensional changes of the fluid flow path, among others. For example, the coil resistance $R_{coil}$ is a function of the coil's temperature.

$$R_{coil} = R_{coil@25°\,C} + R_T(T - 25°\,C)$$

From the equation we see that the coil resistance $R_{coil}$ increases linearly with temperature change, increasing when the temperature increases while decreasing when the temperature decreases.

Figure 2:
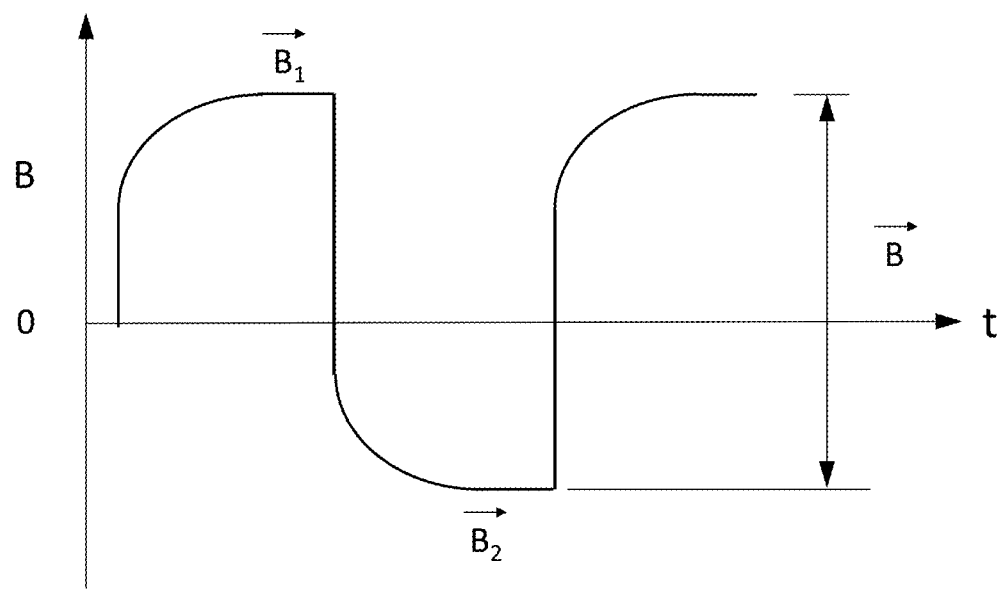
FIG. 2 illustrates a time varying magnetic field B created within a fluid flow path of a magnetic flowmeter.

With reference to FIG. 2, an exemplary depiction of a magnetic field B magnitude within the flow field is shown as not perfectly symmetrical (e.g., amplitude of $\vec{B}_1$ does not equal $\vec{B}_2$) for a given flow meter assembly. Ideally the absolute value of $\vec{B}_1$ would equal the absolute value of $\vec{B}_2$, thereby enabling the time varying magnetic field B to be uniform over time. The individual values of $B_1$ and $B_2$ are generated by alternating the direction of current flow through each coil assembly (18, 20), i.e. $B_1$ is the magnetic field generated from current flowing through both coil assemblies in a first direction, while $B_2$ is the magnetic field generated from current flowing through both coil assemblies in a second direction (as further described below). Moreover, the current flow through each coil assembly (18, 20) follows the right hand rule, and as such, each coil assembly generates a respective magnetic field, which combined together obtains a respective magnetic field present across the fluid ($B_1$, $B_2$). For example, a magnetic field generated by a first coil assembly (e.g. 18 in FIG. 1) may be going inward toward the fluid, while a magnetic field generated by a second coil assembly (e.g. 20 in FIG. 1) is going outward of the body 12 and oriented around the tubular body, thereby augmenting with its value the magnetic field of the first coil assembly. An overall, absolute magnetic field $\vec{B}$ over a given time period can be based on a summation of $\vec{B}_1$ and $\vec{B}_2$. Moreover, as noted earlier, each magnetic field generated by each coil assembly is proportional to the respective drive current, and thus, by regulating the individual coil drive currents, a uniform magnetic field can be achieved.

Referring again to FIG. 1, the coil drive system includes first and second coil drivers (32, 34) which drive the current through the first and second coil assemblies (18, 20), first and second sensors (36, 38) for measuring an electrical property associated with the coil assemblies, first and second voltage sources (39, 41) coupled to first and second voltage regulators (52, 54), respectively, for outputting a desired voltage to each coil driver (32, 34) based on feedback received from a first and second PID controller (48, 49). Each PID controller (48, 49) is responsive to the respective sensed electrical property.

The two coil assemblies (18, 20) are simultaneously driven by the two independently controlled and operated coil drivers (32, 34), each providing a respective time-varying drive current. The coil drivers (32, 34) are each electrically coupled to a respective voltage source (39, 41) with a voltage output that is regulated by a respective voltage regulator (52, 54) in real-time based upon feedback from the sensors (36, 38) which measure an electrical property of the coil assemblies. This ensures that a constant drive current is provided by the coil drivers (32, 34) to the coil assemblies (18,20) regardless of environmental and physical changes to the coil assemblies. The drive current through the coils can have a frequency range of near zero (0 Hz) to the kilohertz range, and a magnitude generally under ten (10) amps.

Figure 3:
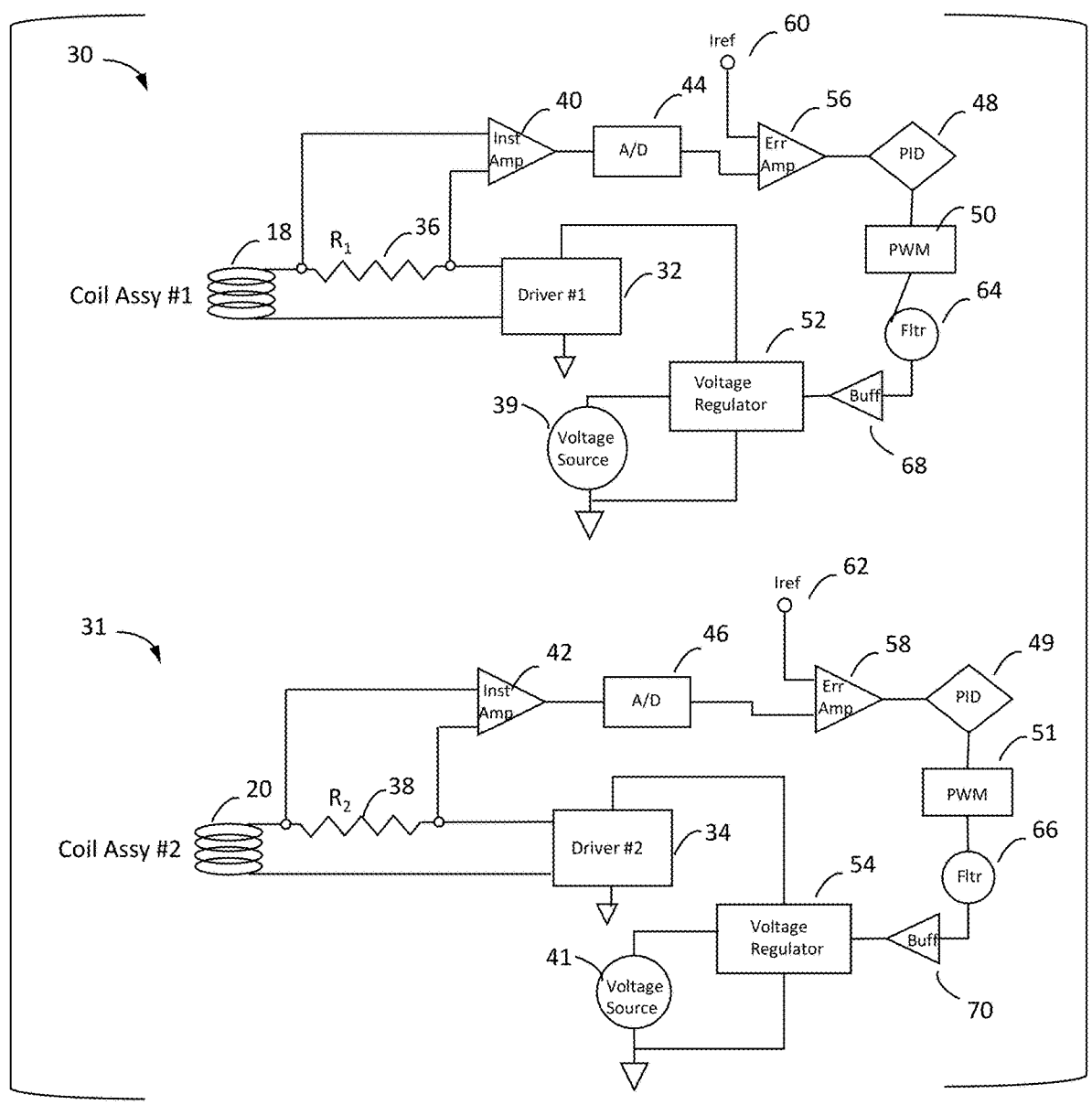
FIG. 3 is a simplified diagram of a circuit for independently driving and controlling the magnetic field of a magnetic flowmeter

With reference to FIG. 3, the coil drive systems (30, 31) for each coil assembly (18, 20) is shown in greater detail. It should be noted that most Helmholtz coils employ direct current (DC) to produce a static magnetic field. However, for this flowmeter application, a time varying magnetic field is used to avoid material migration of the coil assemblies (18, 20) (described below).

As aforementioned, the drive systems (30, 31) each include a pair of coil drivers (32, 34) for driving the first and second coil assemblies (18, 20), sensors that can be embodied as shunt resistors (36, 38) for measuring the respective current driving the coil assemblies, a pair of instrumentation amps (40, 42) for scaling the respective measured drive current, a pair of A to D converters (ADC) (44, 46) for converting the analog signal to a digital signal, and a pair of proportional-integral-derivative (PID) controllers (48,49) for controlling the output voltage to each coil driver circuit via a pair of pulse width modulators (PWM) (50, 51) and voltage regulators (52, 54). The voltage regulators (52, 54) enable for regulating the voltage from each respective voltage source (39, 41) to output a desired voltage to each coil driver circuit.

The two coil drivers (32, 34) are energy management integrated circuits (IC) which provide an active power pulse output. The coil drivers can be a fully integrated IC or a bridge built using discrete components, i.e. power MOSFETS. In an exemplary embodiment, the coil drivers can be embodied as H bridge drivers, configured with very low resistance and thus low voltage drop during coil driving. As such, the coil drivers are capable of alternating the direction of the current passing through each coil assembly (described further below), thereby impacting the direction of the magnetic field emitted from each coil. Alternating the direction of the current, and thus magnetic field, is implemented so as to avoid the electrochemical phenomenon of electrode migration.

The shunt resistors (36, 38) create a voltage drop that is proportional to the current flowing through them. The shunt resistors have a fairly low resistance to limit power dissipation losses and minimize the impact on the magnetic field B. For example, a 0.1 Ohm resistance in a 10A circuit will drop 1 volt.

Figure 7:
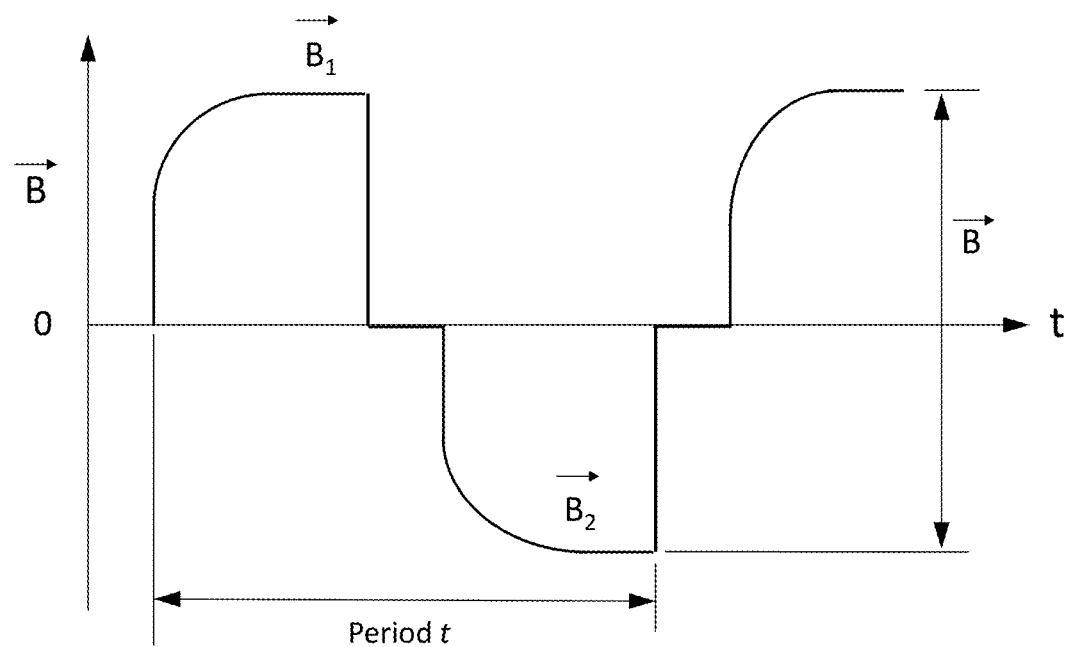
FIG. 7 illustrates a time varying magnetic field B within the fluid flow path based on alternating current direction flowing through a coil assembly.

In addition and/or alternatively, the resistance over the shunt resistors (36, 38) can be manipulated to help obtain a stable drive current, and thus magnetic field, faster. Considering that the current driven through the coil assemblies can be time-varying, obtaining a stable current faster will prolong the plateau of the magnetic field magnitude as depicted in FIGS. 2 and 7, and thereby maximize the conditions for obtaining accurate flow measurement in a given time period, as depicted by corresponding regions of stable voltage measurements in FIG. 8.

As seen in the below equation, current (I) can be defined as a function of voltage (V), resistance (R), inductance (L) and time (t):

$$I = V/R * [1 - e^{(-)R/L * t}]$$

The resistance across the coil driver system can be based on the resistance across the shunt resistors (36, 38), and the resistance within each coil assembly (18, 20) i.e. coil resistance. The inductance is based on the coil assembly configuration i.e. coil inductance. Specifically, the coil resistance and coil inductance are unique for each of the coil assemblies (18, 20), and are determined by the number of coil turns and the coil geometry within the respective coil assembly (18, 20). Referring to the above listed equation for current (I), it is apparent that a larger resistance will provide for a stable current faster. Thus, the shunt resistors can be manipulated with a resistance that will optimally provide a stable current faster without significantly impacting the magnetic field due to power dissipation losses from a higher voltage drop.

Referring now to FIG. 3, the two instrumentation amps (40, 42) receive the respective voltage across the shunt resistors (36, 38), which are then scaled in a manner enabling the received voltage to be processed. The instrumentation amps (40, 42) amplify the signal and maintain a linear relationship between the respective input current and the respective output voltage. The analog-to-digital converters (44, 46) receive the analog output from the instrumentation amps (40, 42) and convert it into a digital signal. The analog information is transmitted by modulating a continuous transmission signal and amplifying the signals strength or varying its frequency to add the data to the transmission signal.

In an exemplary embodiment, the digital data from the two A/D converters (44, 46) represent the drive current measured through the respective coil driver system (30, 31) by the shunt resistors (36, 38). An error amplifier (56, 58) identifies the difference between a respective targeted (reference) current ($I_{ref}$) (60,62) and the corresponding measured current, and outputs an error signal. The targeted (reference) current ($I_{ref}$) can be specified based on an optimal balance between a desire for 1) a stronger magnetic field (B) and 2) an effective power consumption (i.e. I). Higher power may be inefficient, such as due to inadvertent heat being generated. On the other hand, higher power output may be required considering that the magnetic field strength, as applied to a fluid, decreases as the pipe size increases.

With continued reference to FIG. 3, the PID controllers (48, 49) are configured to receive the respective error signal, and apply proportional, integral, and derivative (PID) factors such that the difference between the targeted current ($I_{ref}$) (60,62) and corresponding measured current (for the respective coil assembly) are kept at a minimum, specifically seeking to eliminate any difference (i.e. seeking $I_{ref}$=respective measured current). Specifically, PID controllers use a combination of 1) specifying an output proportional to the error detected (proportional controller), 2) minimizing the steady-state error by limiting the response rate of the system, so as to not over-shoot the system-corrected response (integral controller), and 3) predicting the system response based on an output (derivative controller). As such, the PID controller is configured to implement a System Tuning Process enabling a better targeted output for minimizing error signals. The PID controller (48, 49) will subsequently output commands to the pulse width modulator (PWM) (50, 51).

In an alternate embodiment, a micro-processor can receive the digital data from the two A/D converters (44, 46), process the data using instructions stored in the respective memory, and provide the results as an output. Such data processing can include comparing the measured electrical property (i.e. current) against a target electrical property, wherein the processor then computes the PID output, and subsequently outputs a series of commands for the pulse width modulators (50, 51). The micro-processor is any embedded microcontroller capable of performing the aforementioned tasks. An example of a micro-processer is a Raspberry Pi single board computer developed by the Raspberry Pi Foundation. However, it should be appreciated that current measurements can be processed by a general-purpose processor (e.g., x86 device), a micro-controller, a gate array, an application specific integrated circuit (ASIC), or other type of computer processor.

Referring now to FIG. 3, pulse width modulation (PWM) is used to control the current supplied to the two coil drivers (32, 34) via the output from the respective PID controller (or micro-processor, micro-controller, etc.). The pulse width modulators (50, 51) control the average voltage output, (and thereby regulate the current passing through each respective coil assembly (18, 20), by switching between supply and load rapidly based upon commands received from the PID controllers (48, 49). Each PWM (50, 51) can be configured with a duty cycle ranging from 0 to 100% and frequencies that can range in kHz, in order to bring the ERROR to zero. Moreover, the use of PWM ensures that the power loss in the switching device is low and that there is minimal current being delivered to the coil assemblies when the switch is "off".

The PWM signal is subsequently filtered (64, 66) and converted into a DC voltage that is buffered (68, 70), which is then used to control the voltage regulators (52, 54) to output a voltage to the respective coil driver circuit in a manner that enables the current through the coil assemblies to remain constant (or as close as possible) to the targeted current ($I_{ref}$). As such, a prescribed magnetic field (B) will be generated, overcoming the presence of factors that may influence said magnetic field, and thus enable for a more accurate flow measurement.

The voltage sources (39, 41) coupled to the respective voltage regulators (52, 54) are a dependent or controlled voltage source which maintains a fixed voltage generally independent of the output current. In an alternate embodiment, the voltage sources (39, 41) are controlled in real time based on the control signal received from the respective pulse width modulator (50, 51).

An advantage in using individual coil drivers for each coil assembly is that the required voltage output can be reduced by as much as half as compared to a configuration where a single coil driver is used to pass current through the coil assemblies in series. More specifically, the Voltage Headroom needed when using individual coil drivers would be calculated based on:

$$V_1=(R_{Coil1}+R_{Sensor})*I_1$$

wherein $R_{coil}$ represents the coil resistance for a first coil assembly, $R_{sensor}$ represents the respective sensor resistance, and I represents the current passing through a first coil assembly. By contrast, a common coil driver with coil assemblies in arranged in series would require a Voltage Headroom based on:

$$V=R_{Coil1}+R_{Coil2}+R_{sensor})*I$$

As such, a lower voltage source for each coil driver can be used. For example, the voltage required can potentially be lower than that required for a car battery, such as 10.8V.

Another advantage for using an independent coil drive system for each coil assembly includes the ability for each system to compensate if the flow meter assembly suffers from non-symmetrical conditions, such as non-symmetrical ambient influences. Yet another advantage for using independent coil drive systems is the ability to isolate one coil drive system at a time during cursory median flow measurement, thereby saving energy. Furthermore, each coil drive system and assembly can be independently monitored for diagnosing purposes.

Figure 4:
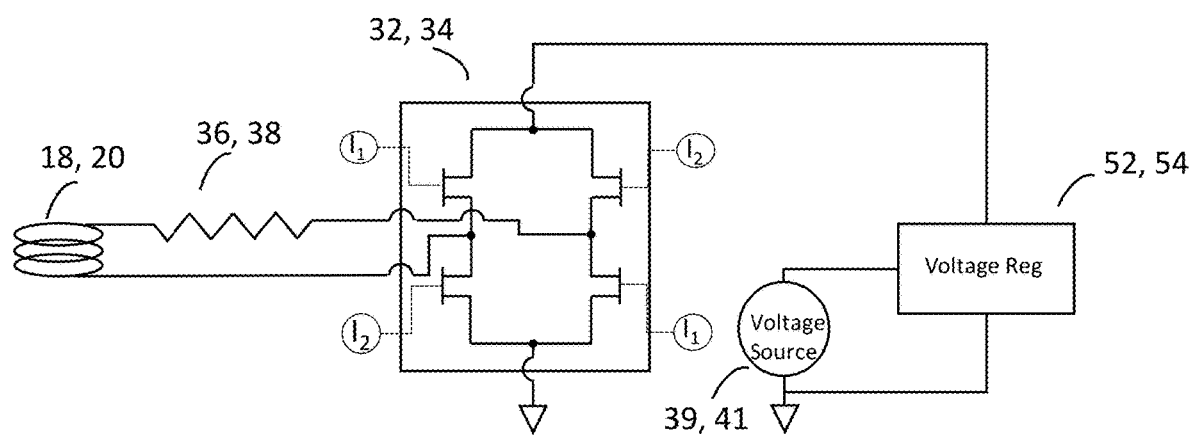
FIG. 4 is a simplified diagram of a circuit for an H bridge coil driver configured to alternate the current direction flowing through a coil assembly.
Figure 5:
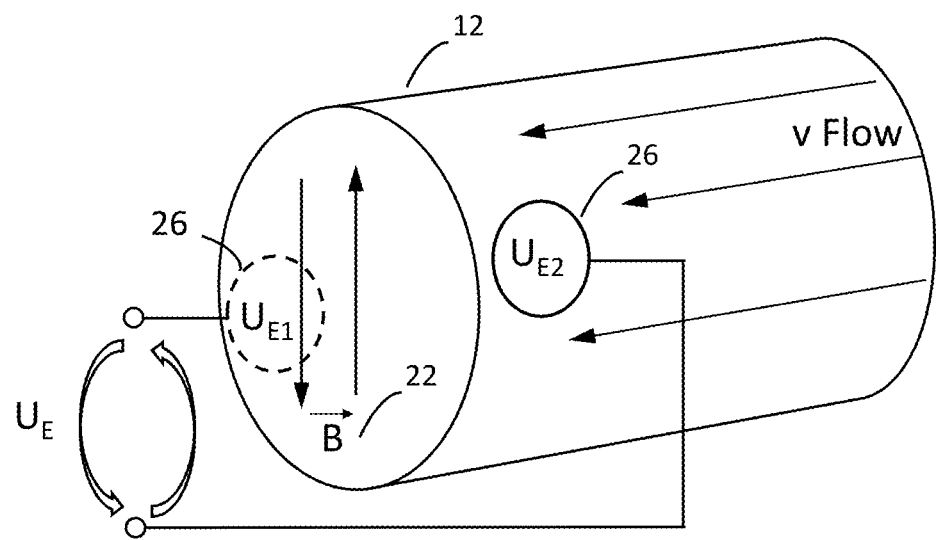
FIG. 5 is a simplified perspective view depicting the operation of the independent coil driver in accordance with the present invention.
Figure 6:
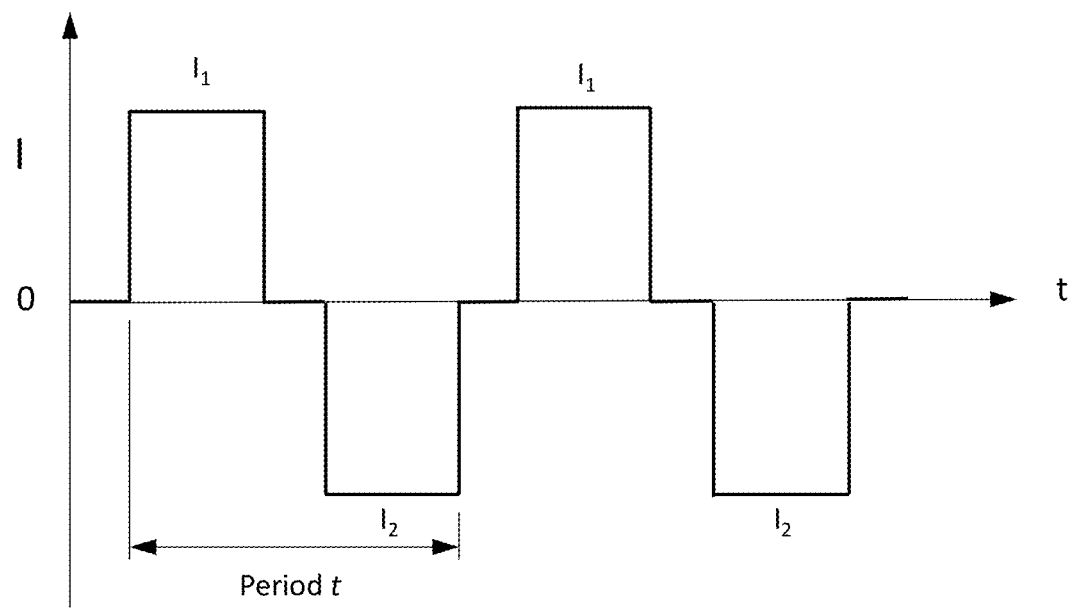
FIG. 6 illustrates a time varying electrical current (I) depicting alternating current directions flowing through a coil assembly.

Referring now to FIG. 4, a detailed depiction of an H bridge driver representing a respective coil driver (32, 34 in FIG. 3) is shown, wherein the current, based on the output voltage from a corresponding voltage regulator (52, 54), can flow through the respective coil assembly (18, 20) through one of two paths. Based on a first path, denoted as $I_1$, the H bridge driver will be configured to direct the current to flow clock-wise through the coil assemblies by preventing the current to flow through a second path denoted as $I_2$ within the driver. Conversely, based on the second path ($I_2$), the H bridge driver will direct the current to flow counter-clockwise through the coil assemblies by preventing the current to flow through the first path within the driver. As such, following the right-hand rule, and as depicted in FIG. 5, the direction of the magnetic field 22 will alternate based on the current direction, and thus, the direction of voltage potential as measured by the electrodes 26 will also alternate. As seen in FIG. 6, a time period T denotes a complete cycle for the alternating current flow direction through the coil assemblies, i.e. clockwise flow through the coil assemblies followed by counter-clockwise flow. Moreover, FIGS. 7-8 further depict the characteristic of the magnetic field generated by the coil assemblies and the voltage potential measured by the electrodes, respectively, corresponding to the time period τ for an alternating current flow direction cycle.

The coil drivers further have an integrated on-chip voltage reference, ultra-low temperature drift (<15 ppm/C°) and are highly reliable. The drivers may include a serial SPI interface to access digital data.

Referring now to FIGS. 5-8, we'll explain how the coil drive system zeros $U_E$ and establishes a uniform magnetic field B within the fluid flow field. With reference to FIG. 5, the voltage potential $U_E$ across the conductive fluid is the difference in voltages between the measuring electrodes $U_{E1}$ and $U_{E2}$. As noted earlier, a constant magnetic field B across the fluid flow v is achieved when $U_E$ is zero.

$$U_E = U_{E1} - U_{E2}$$

With reference to FIG. 6, an illustrative drive current (I) is shown with magnitudes ($I_1$, $I_2$) and period τ. As noted earlier, each coil driver is individually controllable and drives a single coil assembly. Drive current $I_1$ represents current driven in a first direction by the coil drivers, and drive current $I_2$ represents current driven in a second direction by the coil drivers. The drive currents can have a frequency range of near zero (0 Hz) to the kilohertz range and a magnitude generally under ten (10) amps. In this example, the magnitude of the drive currents ($I_1$, $I_2$) are equal. However, we will later describe how the drive currents ($I_1$, $I_2$) for each coil driver are modulated to produce a constant time-varying magnetic field B.

With reference to FIG. 7, an illustrative time varying magnetic field $\vec{B}$ is shown with magnitudes ($B_1$, $B_2$) and period τ. As noted earlier, variations in the magnetic field $\vec{B}$ can introduce errors into the fluid velocity measurements. So, it is important that changes in the magnetic field are corrected in real-time to ensure that the fluid flow measurements are accurate and consistent over time. In this example, we see that $\vec{B}_1$ and $\vec{B}_2$ have the same absolute magnitude and the period is consistent over time.

Figure 8:
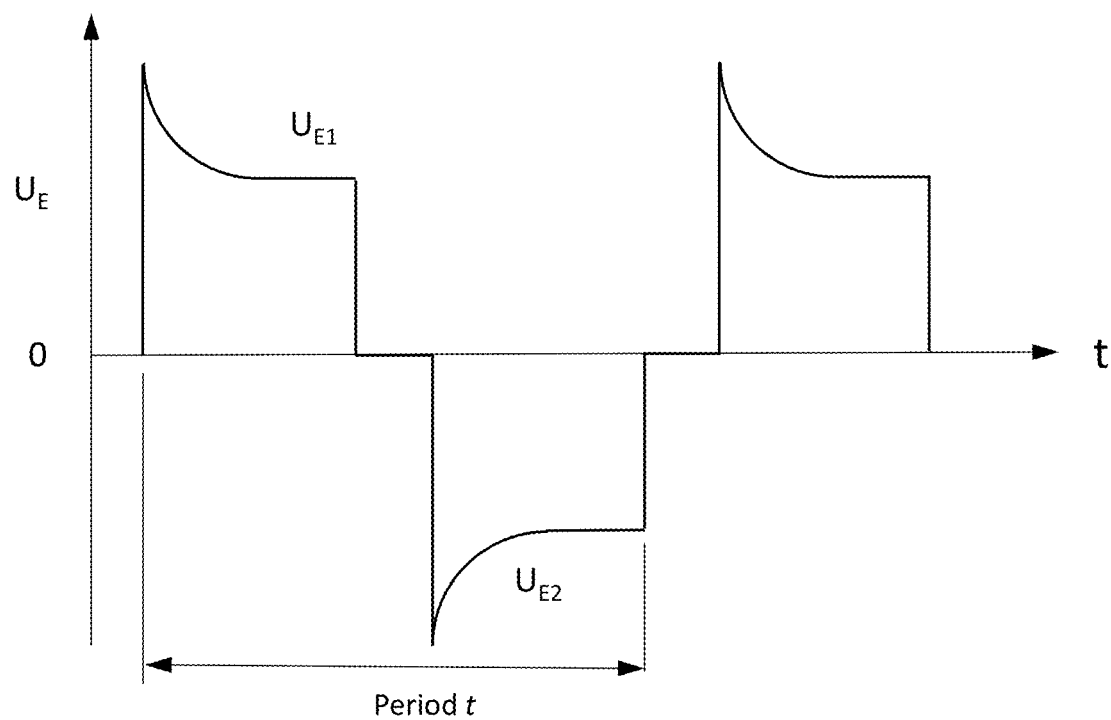
FIG. 8 illustrates a time varying voltage measured between measuring electrodes based on alternating current direction flowing through a coil assembly.

With reference now to FIG. 8, an illustrative drive voltage $U_E$ is shown with magnitudes ($U_{E1}$, $U_{E2}$) and the same period as the T magnetic field B. As discussed earlier, $U_E$ is the difference between the voltages of the individual measuring electrodes $U_{E1}$ and $U_{E2}$ and a constant magnetic field B is achieved when $U_E$ is zero (e.g., the absolute magnitude of $U_{E1}$ and $U_{E2}$ are equal). In this example we see that the absolute magnitudes of $U_{E1}$ and $U_{E2}$ are the same and that the period is consistent over time.

Figure 9:
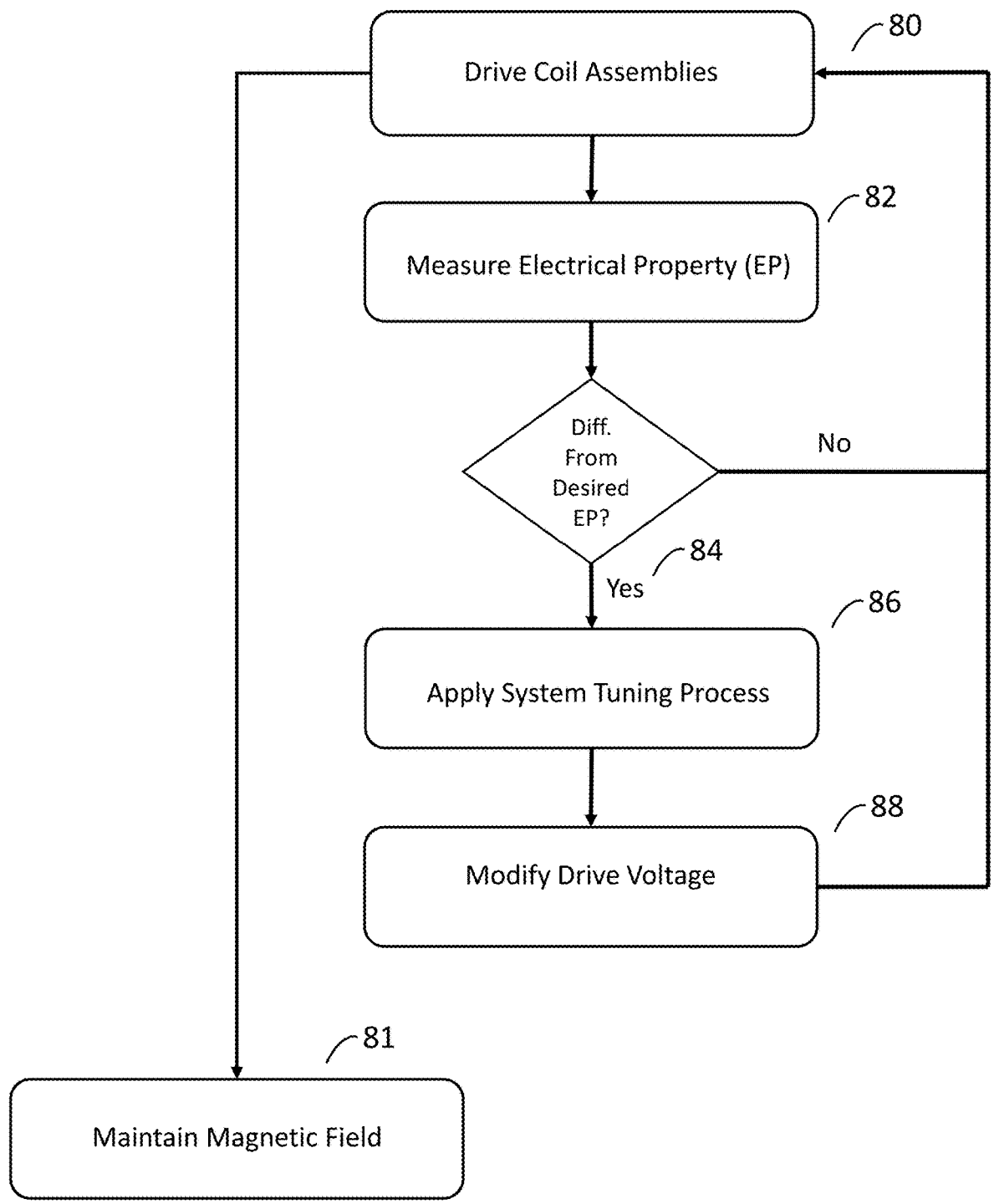
FIG. 9 depicts a method for controlling a full bore magnetic flow meter in accordance with the invention.

With reference now to FIG. 9, a method for controlling a full-bore magnetic flowmeter is described. The method begins by providing a drive current to the two coil assemblies using the first and second coil drivers (Step 80). The respective drive current generates (step 81) a corresponding magnetic field based on the drive current through the coils.

A sensor measures (Step 82) an electrical property in a respective coil assembly, which is then scaled by an instrumentation amplifier, and converted from an analog to digital signal using the A/D converter. Using an error amplifier, the digital signal of a respective measured electrical property is compared against a targeted (desired) electrical property. If the measured electrical property is identical to the desired electrical property, (e.g., $I_{ref}$=measured electrical property), then the measured current passing through the coil assemblies are generating the desired magnetic field, and the voltage regulators continues operating with the same output voltage ("No" branch). Alternatively, if an error signal is detected between the desired electrical property and measured electrical property (e.g., $I_{ref} \neq$ measured electrical property), the output voltage is modified ("Yes" branch) (Step 84).

Using a PID controller, a system tuning process is applied (Step 86) to minimize the error signal detected, wherein the tuning process provides an output that enables a targeted system response that efficiently addresses a measured error. The voltage regulators are provided with an output from a PWM that modifies the respective drive voltage (step 88). As such, each coil assembly is driven by a current, via the modified drive voltage, that seeks to generate a desired magnetic field (step 81) and minimize the error between a targeted reference current.

Figure 10:
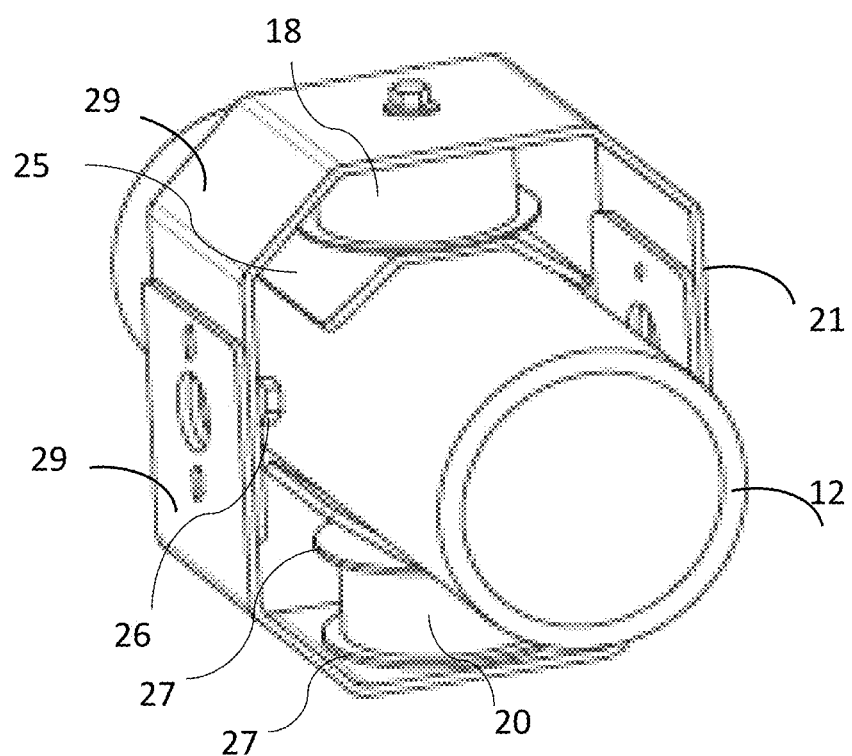
FIG. 10 is a simplified perspective view of a magnetic flowmeter assembly in accordance with the present invention, including a brace coupled to a pair of coils forming magnetic circuitry circumscribing the pipe.

With reference now to FIG. 10, the coil assemblies 18, 20 are coupled to a tubular body (pipe) 12 in an intermediate region thereof. The coil assemblies are mounted external to the pipe, aligned along the axis (Az). More particularly, each coil is held in place by a brace 21 that circumscribes the pipe 12. A magnetic pole 25 is disposed between each coil 18 and the pipe. The magnetic pole is formed of conductive material, e.g., metal same as the magnetic brace, soft magnetic Carbon Steel with Fe %>99.4, and shaped to conform about the pipe. Non-conductive (airgap) shims 27 are disposed on opposing ends of the coils. With each coil, a first airgap shim 27 is sandwiched between the coil and the corresponding magnetic pole 25, and a second airgap shim 27 is sandwiched between the coil and the brace 21. In each coil, there is a core made of a material with good magnetic properties. These cores are transferring the flux lines from the coils into the pole shoes and the magnetic brace.

The brace 21 further serves as magnetic circuitry for the magnetic field generated by the coils (18, 20), which conducts the magnetic field going outwards the pipe to be added to the magnetic field going inwards. The brace has a generally octagonal shape, which benefits assembly and operation of the assembly 10. More particularly, the brace 21 is formed of two, generally c-shaped components 29 that slidably mate with each other about the pipe, to couple to each other. In this manner, the brace 21 can be used on pipes having different diameters. Attachments (e.g., bolts) couple the coils to the brace along the axis (Az).

The assembly 10 is configured to generate a strong alternating magnetic field (flux) B that is distributed evenly over the pipe cross-section. Utilizing an alternating magnetic field avoids electrode material migration. Configuration of the brace 21, e.g., including shape and materials, facilitates the resulting magnetic field (flux) B within the pipe 12. In the exemplary embodiment, the brace 21 is formed of "soft" magnetic materials, such as soft ferrous material, which refers to relative permeability, meaning it has no remnant magnetization, when shut down. As such, magnetic losses are minimized for the magnetic field going outwards from the pipe and added to the magnetic field going inwards to the pipe.

With reference now to FIG. 11, the assembly 10 further includes a housing 72 configured to protect the magnetic field generator (which includes the coils 18, 20 and the brace 21), from environmental exposure. The assembly 10 further includes an electronics assembly 74 attached to the housing of the assembly. The electronics assembly is in electrical communication with the electrodes (19, 26) and the coil assemblies (18, 20) to operate the assembly 10. In an exemplary embodiment, electronics assembly can house components such as drivers (32, 34), op amps (40, 42), A to D converters (ADC) (44, 46), PID controllers (48, 49) (or a micro-processor), and pulse width modulators (PWM) (50, 51), among others.

It should be appreciated from the foregoing that the present invention provides a magnetic flow meter assembly having a novel coil drive and control system. The magnetic flow meter assembly has a tubular body (e.g., pipe) that has two opposing ends and which are aligned along a horizontal axis (Ax) and which define a fluid flow path therebetween. The magnetic flow meter assembly includes a pair of coil assemblies which are coupled to an intermediate region of the flowmeter, and are configured to pass current as received from voltage regulators via a first and second coil driver. The coil assemblies can therefore generate a magnetic field within the fluid flow path of the tubular body, via the current passing therein. A pair of measuring electrodes attached to the body is configured to detect a voltage induced by the conductive fluid passing through the magnetic field. Moreover, the coil assemblies are each electrically coupled with at least one sensor that provides feedback to a respective voltage regulator via a proportional-integral-derivative (PID) controller configured to keep the ERROR between a respective measured current and a target current as zero. As such, based on the received feedback, the respective voltage regulators can manipulate the current passing through the corresponding coil assembly to overcome factors causing the drive current to deviate from a targeted current, thereby enabling a prescribed magnetic field to be created within the fluid flow for accurate flow measurement.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

Although the invention has been disclosed in detail with reference only to the exemplary embodiments, those skilled in the art will appreciate that various other embodiments can be provided without departing from the scope of the invention, to include any and all combination of features discussed herein.

What is claimed is:

1. An assembly for controlling a flow meter configured to measure the velocity of a conductive fluid in a flow path, comprising:
   a first coil assembly circuit that generates a first magnetic field proximate the flow path, the first coil assembly circuit comprising:
      a first voltage source providing a first voltage output;
      a first coil driver configured to provide a first current to a first coil assembly based on the first voltage output; and
      a first sensor configured to measure a first electrical property associated with the first coil assembly, the first voltage source configured to modify the first voltage output responsive to a first feedback signal received based on the first electrical property, to attain a prescribed first current and generate a prescribed first magnetic field; and
   a second coil assembly circuit that generates a second magnetic field proximate the flow path, the second coil assembly circuit comprising:
      a second voltage source providing a second voltage output;
      a second coil driver configured to provide a second current to a second coil assembly based on the second voltage output; and
      a second sensor configured to measure a second electrical property associated with the second coil assembly, the second voltage source configured to modify the second voltage output responsive to a second feedback signal received based on the second electrical property, to attain a prescribed second current and generate a prescribed second magnetic field, the first and second prescribed magnetic fields configured to maintain a constant magnetic field proximate the fluid flow path.

2. The assembly as defined in claim 1, further comprising a first voltage regulator that regulates the first voltage output based on the corresponding voltage source and corresponding feedback signal; and a second voltage regulator that regulates the second voltage output based on the corresponding voltage source and the corresponding feedback signal.

3. The assembly as defined in claim 2, wherein the first and the second feedback signals are output by a first and second pulse-width-modulator (PWM) respectively, each PWM electrically coupled to the respective voltage regulator.

4. The assembly as defined in claim 3, wherein a first and a second proportional-integral-derivative (PID) controller outputs commands to the first and second PWM respectively for creating the respective feedback signal, each output command based on the respective measured electrical property and a target electrical property.

5. The assembly as defined in claim 4, further comprising a first and a second error amplifier configured to provide the respective PID controller with a computed difference between the respective measured electrical property and the target electrical property.

6. The assembly as defined in claim 3, further comprising a first and a second processor configured to:
   compute a difference between the respective measured electrical property and a targeted electrical property; and
   compute PID output commands to the respective PWM for creating the respective feedback signal.

7. The assembly as defined in claim 5, wherein each PWM output is filtered and buffered prior to being transmitted to the respective voltage regulator.

8. The assembly as defined in claim 1, wherein each coil driver is embodied as a H bridge driver configured to alternate the current direction to the respective coil assembly.

9. The assembly as defined in claim 1, wherein the measured first and second electrical properties are the first and second current in the first and second coil assemblies respectively.

10. The assembly as defined in claim 1, wherein the first and second coil drivers operate independently of one another.

11. The assembly as defined in claim 1, wherein the first and second voltage outputs are each lower than 10.8V.

12. A method for operating a flow meter, the flow meter configured to measure the velocity of a conductive fluid in a flow path, the method comprising:
    driving a first coil assembly with a first current from a first coil driver, the first current resulting from a first voltage output from a first voltage source;
    driving a second coil assembly with a second current from a second coil driver, the second current resulting from a second voltage output from a second voltage source;
    measuring a first and second electrical property associated with the first and second coil assemblies respectively;
    modifying the first and second currents via the first and second voltage sources responsive to the first and second measured electrical properties; and
    maintaining a constant magnetic field proximate the fluid flow path by controlling the first and second currents driving the first and second coil assemblies responsive to the respective measured electrical properties.

13. The method as defined in claim 12, further comprising regulating the first and second voltage outputs with a first and second voltage regulator respectively based on the respective measured electrical property.

14. The method as defined in claim 13, further comprising outputting feedback signals from a first and second pulse-width-modulator (PWM) based on the respective measured electrical property, the outputted feedback signals configured to modify the first and second currents via the first and second voltage regulators.

15. The method as defined in claim 14, further comprising outputting commands from a first and second proportional-integral-derivative (PID) controller to the first and second PWMs respectively, the outputted commands based on the respective measured electrical property and a target electrical property.

16. The method as defined in claim 15, further comprising:
    computing error signals between the respective measured electrical property and the target electrical property with a first and second error amplifier, and
    transmitting the respective computed error signals to the corresponding PID controller.

17. The method as defined in claim 16, further comprising:
    amplifying the respective measured electrical property with a first and second instrumentation amplifier;
    converting the respective amplified measured electrical property from an analog signal to a digital signal with a first and second analog-to-digital converter; and
    transmitting the respective digital signal to the first and second error amplifiers.

18. The method as defined in claim 17, further comprising:
    filtering the outputted feedback signals with a first and second filter; and
    buffering the filtered feedback signals for the respective voltage regulator.

19. The method as defined in claim 12, wherein driving the first coil assembly with a first current and driving the second coil assembly with a second current are performed independently of one another.

20. The method as defined in claim 12, wherein the first and second voltage outputs are each less than 10.8V.

\* \* \* \* \*